(12) United States Patent
Suzuki

(10) Patent No.: US 6,788,706 B1
(45) Date of Patent: Sep. 7, 2004

(54) FRAME HANDLING SYSTEM, AND FRAME HANDLING METHOD

(75) Inventor: Yuichi Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/577,669

(22) Filed: May 25, 2000

(30) Foreign Application Priority Data

May 26, 1999 (JP) ............................................ 11-146233

(51) Int. Cl.$^7$ ............................ H04L 12/28; H04J 3/24
(52) U.S. Cl. .................................. 370/474; 370/395.52
(58) Field of Search ......................... 370/395.1, 395.2, 370/395.21, 395.3, 395.31, 395.41, 395.42, 395.43, 395.5, 395.52, 395.53, 395.54, 395.6, 474, 389, 400, 392, 397, 401–402

(56) References Cited

U.S. PATENT DOCUMENTS

| | | | | |
|---|---|---|---|---|
| 6,336,129 B1 | * | 1/2002 | Ise et al. ..................... | 370/397 |
| 6,373,845 B1 | * | 4/2002 | Aramaki et al. ......... | 370/395.3 |
| 6,418,145 B1 | * | 7/2002 | Isoyama et al. ............ | 370/474 |
| 6,480,468 B1 | * | 11/2002 | Kishigami et al. ..... | 370/395.52 |
| 6,490,292 B1 | * | 12/2002 | Matsuzawa .............. | 370/395.1 |
| 6,493,356 B1 | * | 12/2002 | Aramizu et al. ............ | 370/474 |
| 6,580,707 B1 | * | 6/2003 | Ikeda et al. ................. | 370/351 |

FOREIGN PATENT DOCUMENTS

JP          10-322349         12/1998

* cited by examiner

Primary Examiner—Steven H. D Nguyen
(74) Attorney, Agent, or Firm—Foley & Lardner LLP

(57) ABSTRACT

A frame handling system and frame handling method therefor which is capable of speedily handling the frames appropriately according to the type of lines, requiring a minimum function/circuit involvement. this invention is composed of a cell segmentation and reassembler (SAR) portion and a frame handling portion, wherein SAR portion receives a stream of ATM cells from lines VC1 to VCn, separates ATM cells depending on whether they come from VP or VC connections, and assembles them into AAL5 frames. While AAL5 frames being formed, the subsequent frame handling portion seeks the information regarding handling for each frame which has been received through VP or VC connection. The assembled frame containing the data for handling is delivered to the frame handling portion. Thus, it is possible for the frame handling portion to dynamically handle frames depending on the data for frame handling provided by SAR portion.

9 Claims, 5 Drawing Sheets

INSTRUCTION ITEM/ACTUAL VALUE

| ITEM | DATA |
|---|---|
| LLC | 0xAAAA03 |
| OUI | 0x000000 |
| PID | 0x0800(IP) |
| VERSION | 4 |
| IHL | 5~ |
| TYPE OF SERVICE | ... |
| TOTAL LENGTH | ... |
| IDENTIFICATION | ... |
| FLAGS | ... |
| FRAGMENT OFFSET | ... |
| TIME TO LIVE | ... |
| PROTOCOL | ... |
| HEADER CHECKSUM | ... |
| CPCS UU | ... |
| CPI | 0 |
| LI | ... |

Fig. 5

FRAME HANDLING SYSTEM, AND FRAME HANDLING METHOD

BACKGROUND OF THE INVENTION

1. Field of the Invention

The present invention relates to a frame handling system and frame handling method used therefor, particularly to a frame handling system and frame handling method whereby it is possible to dynamically handle frames depending on instructions from a segmentation and reassembly (SAR) portion.

2. Description of the Prior Art

It is necessary for a conventional frame handling system and frame handling method therefor to handle frames appropriately according to the type of multiple input lines, for example, according to the connection types such as VP connections and VC connections, or to the class of traffic such as CBR (constant bit rate) lines for digitized voice and images, VBR (variable bit rate) lines for voice in packets, and best effort type UBR (unspecified bit rate) lines, its frame handling portion seeks and adopts an appropriate handling method based on information regarding VP and VC connections, class of traffic, and state of involved lines received from its SAR portion together with frames.

However, with the conventional frame handling system and method therefor as described above, the frame handling portion must seek an appropriate handling method based on information regarding VP or VC connection, in addition to the information of frames to be handled, and thus it needs a search function before it can determine how handling should be made. This forms a problem.

Further, it must search through the data in frames before it proceeds to handling of the frames, which will require a time which would be otherwise unnecessary.

SUMMARY OF THE INVENTION

This invention aims at providing a frame handling system and frame handling method therefor in which a frame handling portion placed behind an SAR portion, when handling frames received through lines of VP or VC connection and of different classes of traffic, is capable of speedily handling the frames appropriately according to the type of lines, requiring a minimum function/circuit involvement.

This invention particularly aims at providing a frame handling system and frame handling method therefor in which a frame handling portion to handle frames in upper layers and placed behind SAR portion of ATM adaptation layer 5 (AAL5) dynamically handles frames appropriately according to the type of frames, altering the mode of frame handling depending on information provided by the SAR portion.

To achieve the above object, the present invention provides a frame handling system to apply frame handling to a stream of ATM cells received through communication lines comprising a cell segmentation and reassembly (SAR) portion and a frame handling portion, wherein the SAR portion comprises a frame forming portion to separate the information part from the header part for each of ATM cells received through communication lines and to form a frame based on the information, and a frame handling mode setting portion to provide data for frame handling in accordance with the information part isolated by the frame forming portion, the handling data being attached to the frame to be delivered to the frame handling portion, while the frame is being formed by the frame forming portion.

In addition, the present invention provides a frame handling system wherein the frame handling portion comprises a frame handling mode selecting portion which selects a frame handling mode in accordance with the handling data attached to the frame delivered by the SAR portion, a handling portion to achieve frame handling as selected by the frame handling mode selecting portion, and a frame handling result returning portion which returns the result of frame handling achieved by the handling portion to the SAR portion together with the handled frame.

In addition, the present invention provides a frame handling system wherein the SAR portion comprises a routing portion which routes a frame in accordance with the instruction returned by the frame handling result returning portion, and a frame handling executor to handle a frame in accordance with the instruction routed by the routing portion.

In addition, the present invention provides a frame handling system wherein the frame handling executor comprises a cell reassembling portion to reassemble cells when the instruction for frame handling notifies transmission through communication lines, a discarding portion to discard the handled frame when the instruction notifies disposal, and a delivery-to-processor portion to deliver the handled frame to a processor when the instruction notifies delivery to a processor.

In addition, the present invention provides wherein, when the instruction routed by the routing portion notifies transmission through communication lines, the handled frame with a transmission virtual path (VP) or transmission virtual channel (VC) attached thereto is delivered to the cell reassembling portion.

In addition, the present invention provides a method suitable for a frame handling system comprising an SAR portion and frame handling portion to handle frames after having received a stream of ATM cells through communication lines comprising a signal reception step of receiving a stream of ATM cells through communication lines, a segmentation step of separating the information part from the header part for each of ATM cells received during the signal reception step, a frame handling mode setting step of introducing data for frame handling in accordance with the information part separated in the segmentation step, a frame forming step of forming a frame by attaching the handling data introduced in the frame handling mode setting step to the frame, a frame handling mode selecting step of selecting the handling data attached to the frame formed during the frame forming step, a frame handling step of achieving frame handling in accordance with the data selected during the frame handling mode selecting step, a frame handling instruction returning step of returning an instruction for frame handling to the SAR portion, together with the frame handled in the frame handling step, a frame routing step of routing the frame in accordance with the frame handling instruction returned during the frame handling instruction returning step, a cell reassembling step of reassembling cells when the frame handling instruction notifies delivery thorough communication lines, and a signal transmission step of transmitting, through communication lines, cells reassembled during the cell reassembling step, which is further provided with a discarding step of discarding the frame whenever the instruction received during the frame routing step notifies disposal, and a delivery-to-processor step of delivering the frame to a processor whenever the instruction received during the frame routing step notifies delivery to a processor.

BRIEF DESCRIPTION OF THE DRAWINGS

This above-mentioned and other objects, features and advantages of this invention will become more apparent by reference to the following detailed description of the invention taken in conjunction with the accompanying drawings, wherein:

FIG. 5 gives a list of instruction items and data constituting the header information as shown in FIG. 4.

DESCRIPTION OF THE PREFERRED EMBODIMENTS

Figure 1:
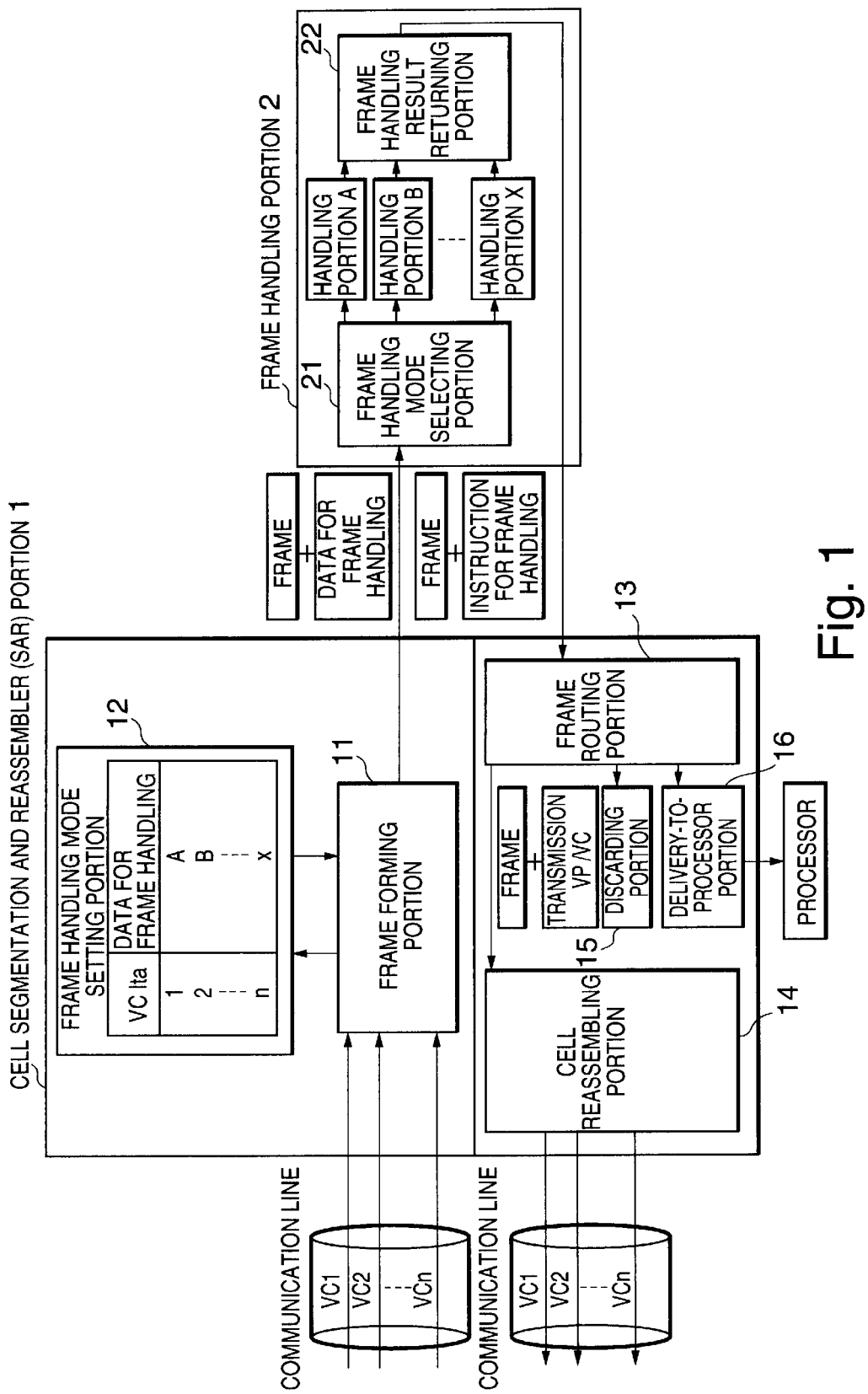
FIG. 1 is a block diagram to show the outline of a frame handling system representing an embodiment of this invention.

Preferred embodiments representing the frame handling system and frame handling method of this invention will be described in detail below with reference to the attached figures. FIG. 1 gives an embodiment representing the frame handling system and method therefor of this invention.

FIG. 1 is a block diagram to show the outline of a frame handling system representing an embodiment of this invention. In the figure, the embodiment representing the frame handling system of this invention is primarily composed of a SAR portion 1 and frame handling portion 2.

SAR portion 1 receives a stream of ATM cells through lines VC1 to VCn, and assembles ATM cells received through virtual path (VP) connection or virtual channel (VC) connection, into an AAL5 frame. While ATM cells being assembled into an AAL5 frame, the subsequent frame handling portion 2 seeks how the frame received through VP or VC connection should be handled. SAR portion 1 has a further function to transfer the frame thus assembled to the frame handling portion 2, together with the data notifying the mode of frame handling.

The frame handling portion 2 handles the frame received from SAR portion 1 according to the specified mode of frame handling.

SAR portion 1 is primarily composed of a frame forming portion 11, frame handling mode setting portion 12, frame routing portion 13, cell reassembling portion 14, discarding portion 15 and delivery-to-processor portion 16.

The frame handling portion 2 is primarily composed of a frame handling mode selecting portion 21 and frame handling result returning portion 22.

Frame forming portion 11 assembles a stream of ATM cells received through lines VC1 to VCn into an AAL5 frame, and delivers the frame to the frame handling mode selecting portion 21 of frame handling portion 2, together with the data notifying handling mode provided by the handling mode setting portion 12 described below.

The handling mode setting portion 12 checks each frame classified according to VP or VC connection through which it has been received, for the mode how it should be handled in the subsequent frame handling portion 2, and delivers data notifying the mode to the frame forming portion 11. The data are then delivered together with a corresponding frame formed by the frame forming portion 11 to the handling mode selecting portion 21.

The handling mode selecting portion 21 of frame handling portion 2 handles the frame, as a subsequent handling, according to the data attached thereto, and delivers the thus handled frame to handling portions A to X.

The handling portions A to X handle the frame assigned to them according to the data for frame handling provided by the handling mode setting portion 12, and the frame handled by the handling portions A to X, together with an instruction for frame handling attached thereto as a result of handling at the handling portions A to X, is delivered to the frame handling result returning portion 22.

The frame handling result returning portion 22 delivers the frame with the instruction to the frame routing portion 13 of SAR portion 1.

The frame routing portion 13, on receipt of the frame and instruction from the frame handling portion 2, handles the frame according to the instruction.

If the instruction notifies transmission, the cell reassembling portion 14 reassembles ATM cells towards VP or VC connections according to the instruction, and transmits them through lines VC1 to VCn.

If the instruction notifies disposal, the frame, after being handled, is delivered to the discarding portion 15 for disposal.

If the instruction notifies delivery to a processor, the frame, after being handled, is delivered to the delivery-to-processor portion 16 for delivery to a processor.

Figure 2:
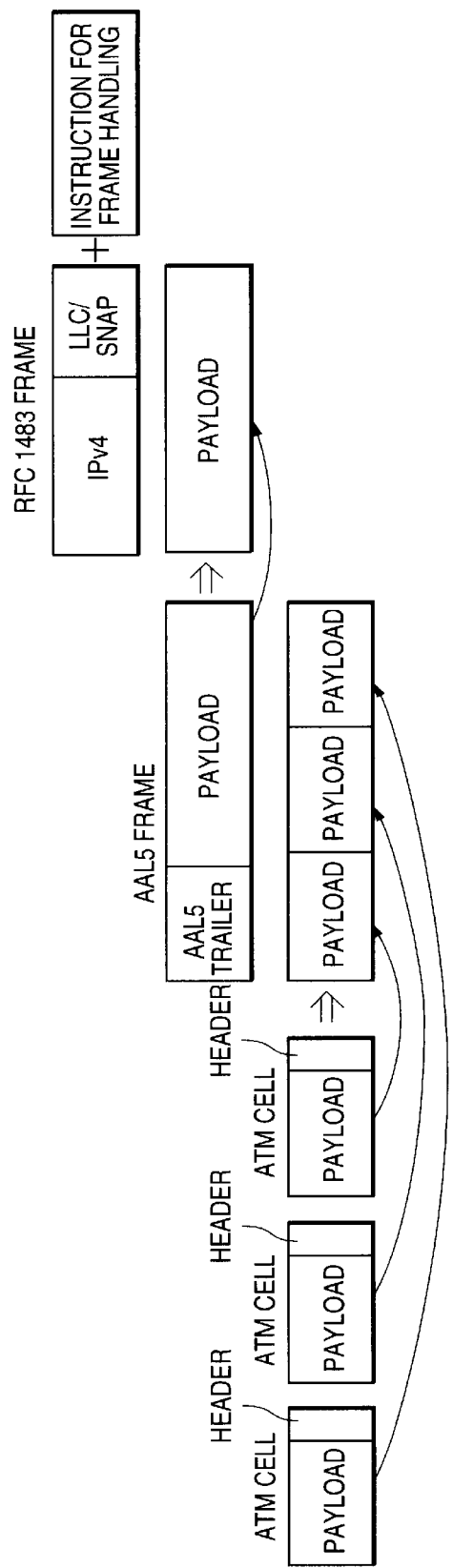
FIG. 2 shows the process of handling frames performed by SAR and frame handling portions of the embodiment of this invention.

FIG. 2 is a diagram to show the process of handling frames performed by SAR and frame handling portions of the embodiment of this invention. In this figure, a stream of ATM cells received through communication lines have each a 53 byte length: the header has a 5 byte length, and payload the remaining 48 byte length. ATM cells having the composition as above are received by SAR portion 1, and handled by the frame forming portion 11 such that headers and payloads are separated. Then, payloads of the cells are combined, to which is added an AAL5 trailer to form an AAL5 frame. The thus formed AAL5 frame is delivered, together with the data notifying handling mode given by the handling mode setting portion 12, to the subsequent frame handling portion 2.

The frame handling portion 2 deprives the AAL5 frame provided by SAR portion 1 of the header (decapsulation), produces an RFC1483 frame comprising IPv4 and LLC/SNAP, and returns it to SAR portion 1 together with an instruction for handling.

Figure 3:
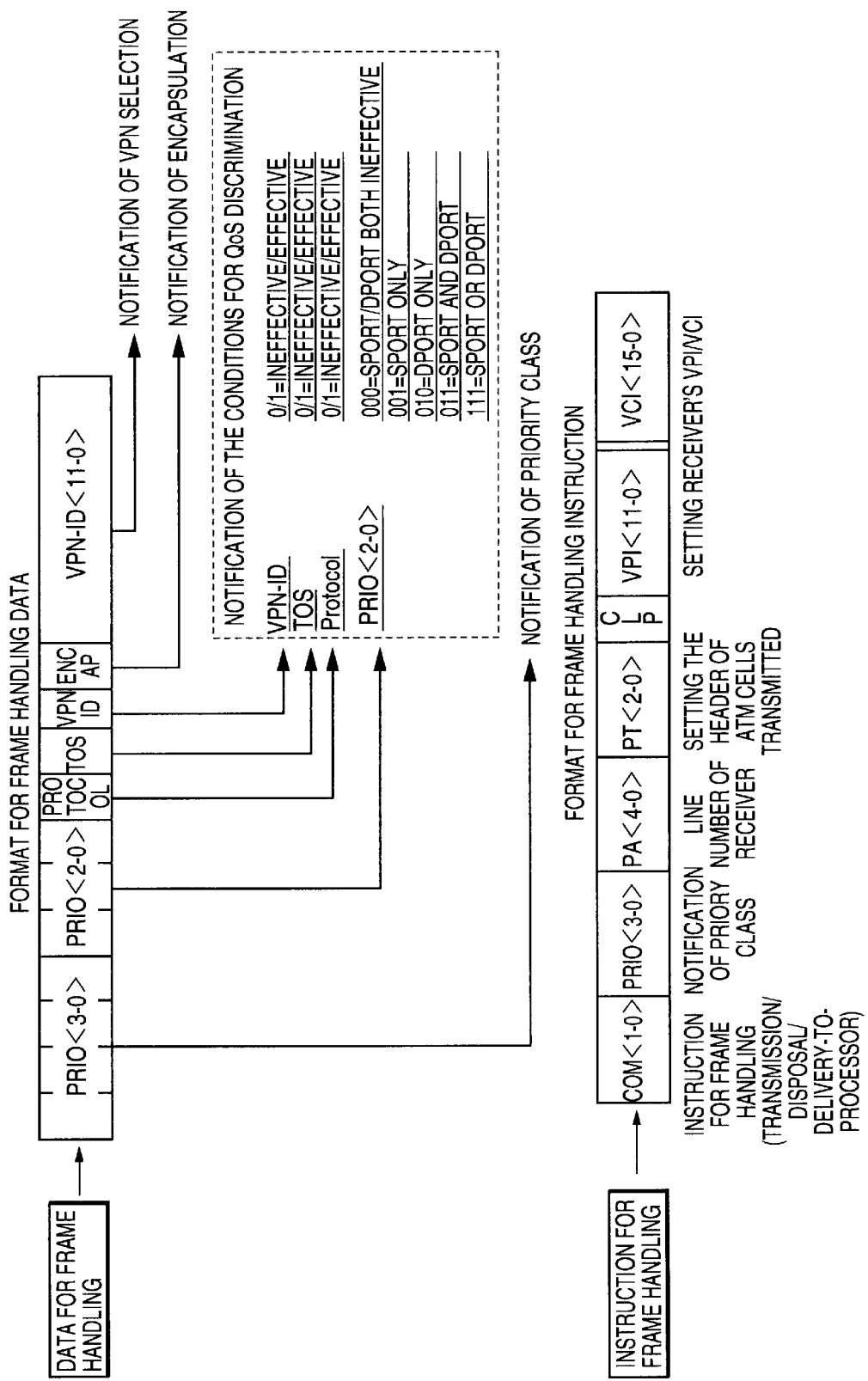
FIG. 3 shows an example of instruction items and data for frame handling used in the embodiment of this invention.

FIG. 3 shows an example of data for frame handling given by the frame handling setting portion 12, and of instructions for frame handling achieved by the frame handling result returning portion 22.

As shown in the figure, the format of instruction item of this embodiment comprises PRIO<3-0> notifying class priority, PORT<2-0> notifying the requirement for QoS discrimination, PROTOCOL, TOS, VPNID, ENCAP notifying whether encapsulation is executed or not, and VPN-1D<11-0> notifying VPN selection.

The format of instruction data of this embodiment comprises COM<1-0> notifying the fate of frame (transmission/disposal/delivery-to-processor), PRIO<3-0> notifying class priority, PA<4-0> notifying the number of receiver, PT<2-0> notifying the header of ATM cells to be transmitted, CLP notifying the bit priority of cell headers, VPI<11-0> notifying the setting of receiver's VPI, and VCI<15-0> notifying the setting of VCI.

As shown above, the data for frame handling concern with checking of IPv4 frames, counting down to indicate the time to live (TTL), search for the receiver, VPN routing, routing of frames according to TOS/TC/CLP, routing of frames according to the port number of TCP/UDP, filtering of frames according to the port number of TCP/UDP and receiver's IP address, IPv4/IPv6 conversion, handling of MPLS label stacks, handling of IPiNIP, and encapsulation/decapsulation of RFC1483 frames.

The cell reassembling portion 14 reassembles ATM cells towards VP or VC connections according to the instructions attached to those cells, and send them through VC1 to VCn.

As seen above, according to the embodiment of this invention, the frame handling portion 2 receives a frame together with an instruction for frame handling from SAR portion 1, and thus can smoothly proceed to the frame handling as instructed, without requiring a pretreatment as in the conventional system where searching of the data prepared separately according to VP and VC connections is required. Therefore, according to the present invention, the efficiency of frame handling is improved and advantage of obviating the need for a pretreatment which requires a more or less function/circuit involvement, is ensured.

The frame handling portion 2 receives an instruction for frame handling as well as a frame from SAR portion 1. It handles the frame according to the attached instruction. The instruction concerns with checking of IPv4 frame, counting down indicating the time to live (TTL), search for the receiver, VPN routing, routing of frames according to TOS/TC/CLP, routing of frames according to the port number of TCP/UDP, filtering of frames according to the port number of TCP/UDP and receiver's IP address, IPv4/IPv6 conversion, handling of MPLS label stacks, handling of IPiNIP, and encapsulation/decapsulation of RFC1483 frames.

This invention may have another embodiment which is fundamentally similar to what is described above, but whose frame and cell assemblers may both be adapted for traffic other than AAL5.

Figure 4:
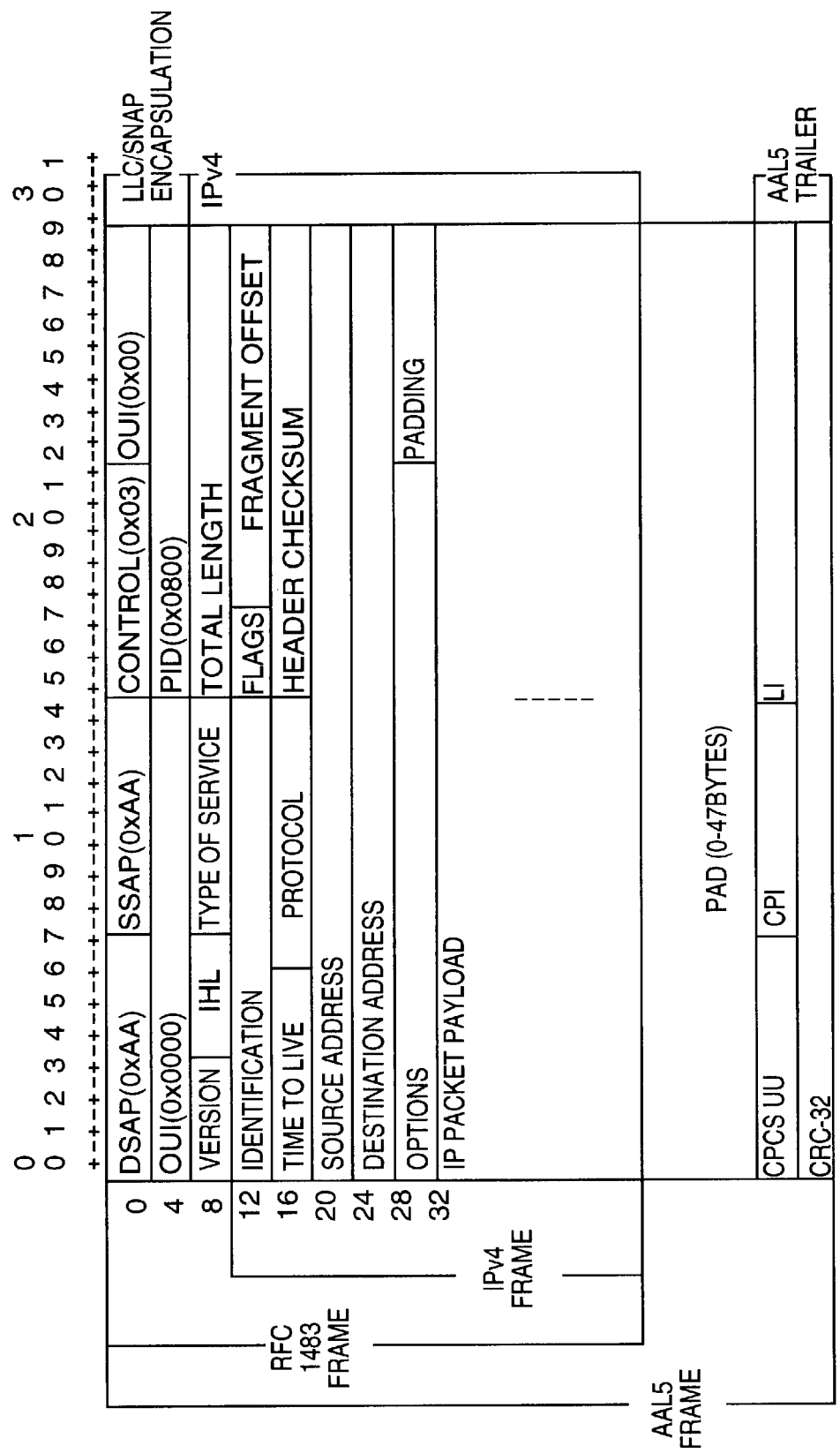
FIG. 4 is an example to show how the headers of AAL5, RFC1483 and IPv4 frames are composed.

FIG. 4 is an example to show how the headers of AAL5, RFC1483 and IPv4 frames are composed.

As shown in the figure, the header of IPv4 frame may take, for example, a following composition.

Identification has a length of 16 bits, and is used as a reference when data are transferred to upper layers. Segmented data are reconstructed on the basis of this 16 bit value.

Flag has a length of 3 bits, and notifies the control of packet segmentation.

Fragment Offset has a length of 13 bits, and notifies, for a given segmented fragment, what position of the original data it has occupied.

Time to Live has a length of 8 bits, and represents in seconds a period over which the relevant packet may exist in the network.

Protocol has a length of 8 bits, and notifies what is the protocol for the upper layer.

Header Checksum has a length of 16 bits, and gives the checksum of IP header.

Source Address has a length of 32 bits, and notifies the IP address of transmitter.

Destination Address has a length of 32 bits, and notifies the IP address of receiver.

Option has a variable length, and is not usually used but for testing or debugging.

Padding is introduced, whenever option is added but the header is not a multiple of 32 bits, to make the header take a multiple of 32 bits.

FIG. 5 gives a list of instruction items and data constituting the header information as shown in FIG. 4. As shown in the figure, the data corresponding to the header items are given: for example, 0xAAAA03 is given as an actual value for LLC.

The frame forming portion may have a dedicated register or memory for implementing an instruction for handling, but it is better, if SAR portion has a header translator (HT), to make the most of blank area in HT, because the same function is achieved with a minimum addition of circuit elements.

Instructions for frame handling may be varied according not only to whether cells are received through VP or VC connection, but to the class of traffic such as CBR, VBR or UBR, or to the type of individual lines.

As seen from above description, at the terminal end of ATM layers, SAR portion searches the data for frame handling, instead of the frame handling portion of upper layers which usually performs the same, and gives an instruction according to the data. This makes it possible to eliminate a searching operation by the subsequent frame handling portion which would be otherwise required. Through this arrangement it is possible for the frame handling portion to handle a frame as soon as it receives the frame from SAR portion, and this improves the frame handling capacity of the frame handling portion.

Further, because the frame handling portion is relieved of searching the data for frame handling as discussed above, it will be possible to reduce the size of necessary circuit. Accordingly, with the frame handling system and method therefor of this invention, it is possible to dynamically handle frames depending on whether they are received through VP or VC connection, without resorting to any software.

What is claimed is:

1. A frame handling system to apply frame handling to a stream of ATM cells received through communication lines comprising a cell segmentation and reassembly (SAR) portion and a frame handling portion, wherein:

the SAR portion comprises:

a frame forming portion to separate an information part from a header part for each of ATM cells received through the communication lines and to form a frame based on the information part, and a frame handling mode setting portion to provide handling data for frame handling in accordance with the information part isolated by the frame forming portion, the handling data being attached to the frame to be delivered to the frame handling portion, while the frame is being formed by the frame forming portion, wherein said frame handling portion receives said handling data and said frame and dynamically handles said frame according to said handling data.

2. A frame handling system as described in claim 1 wherein the frame handling portion comprises:

a frame handling mode selecting portion which selects a frame handling mode in accordance with the handling data attached to the frame delivered by the SAR portion;

a handling portion to achieve frame handling as selected by the frame handling mode selecting portion; and a frame handling result returning portion which returns the result of frame handling achieved by the handling portion to the SAR portion together with the handled frame.

3. A frame handling system as described in claim 2 wherein the SAR portion comprises:

a routing portion which routes a frame in accordance with an instruction returned by the frame handling result returning portion; and a frame handling executor to handle a frame in accordance with the instruction routed by the routing portion.

4. A frame handling system as described in claim 3 wherein the frame handling executor comprises:

a cell reassembling portion to reassemble cells when the instruction for frame handling notifies transmission through output communication lines;

a discarding portion to discard the handled frame when the instruction notifies disposal; and a delivery-to-processor portion to deliver the handled frame to a processor when the instruction notifies delivery to a processor.

5. A frame handling system as described in claim 4 wherein, when the instruction routed by the routing portion notifies transmission through output communication lines, the handled frame with a transmission virtual path (VP) or transmission virtual channel (VC) attached thereto, is delivered to the cell reassembling portion.

6. A frame handling system as described in claim 5 wherein the handling mode setting portion checks each frame classified according to VP or VC connection through which said frame has been received, for a frame handling mode how said frame should be handled in the subsequent frame handling portion, and delivers data notifying the frame handling mode to the frame forming portion.

7. A frame handling system as described in claim 6 wherein the frame handling data format comprising information including at least one of notification of priority class, conditions for QOS discrimination, VPN selection, and encapsulation.

8. A frame handling system as described in claim 7 wherein the frame handling portion returns the result of frame handling as the instruction for frame handling with the handled frame, and the frame handling instruction format comprising the information of the instruction for frame, handling, notification of priority class, line number of receiver, setting the header of ATM cells transmitted, and setting receiver's VPI/VCI.

9. A method suitable for a frame handling system comprising an SAR portion and frame handling portion to handle frames after having received a stream of ATM cells through communication lines comprising:

a signal reception step of receiving a stream of ATM cells through the communication lines;

a segmentation step of separating an information part from a header part for each of ATM cells received during the signal reception step;

a frame handling mode setting step of preparing data for frame handling in accordance with the information part separated in the segmentation step;

a frame forming step of forming a frame by attaching handling data prepared during the frame handling mode setting step to the frame;

a frame handling mode selecting step of selecting the handling data attached to the frame formed during the frame forming step;

a frame handling step of achieving frame handling in accordance with the handling data selected during the frame handling mode selecting step, wherein said frame handling step includes receiving said handling data and said frame and dynamically handling said frame according to said handling data;

a frame handling instruction returning step of returning an instruction for frame handling to the SAR portion, together with the frame handled during the frame handling step;

a frame routing step of routing the frame in accordance with the frame handling instruction returned during the frame handling instruction returning step;

a cell reassembling step of reassembling cells when the frame handling instruction notifies delivery thorough output communication lines; and a signal transmission step of transmitting, through communication lines, cells reassembled in the cell reassembling step, which is further provided with:

a discarding step of discarding the frame whenever the instruction received during the frame routing step notifies disposal, and a delivery-to-processor step of delivering the frame to a processor whenever the instruction received during the frame routing step notifies delivery to a processor.

* * * * *